(12) United States Patent
McQuaide et al.

(10) Patent No.: US 7,698,215 B1
(45) Date of Patent: Apr. 13, 2010

(54) CREDIT CARD MESSENGER

(75) Inventors: A. Chet McQuaide, Berkeley Lake, GA (US); Edward Michael Silver, Atlanta, GA (US); Linda Ann Roberts, Decatur, GA (US); Hong Nguyen, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1631 days.

(21) Appl. No.: 10/090,180

(22) Filed: Mar. 4, 2002

(51) Int. Cl.
*G06Q 40/00* (2006.01)

(52) U.S. Cl. .............................. 705/39; 705/35; 705/40

(58) Field of Classification Search ............... 705/1–66; 380/247, 270; 235/375; 283/58
See application file for complete search history.

(56) References Cited

U.S. PATENT DOCUMENTS

| | | | | |
|---|---|---|---|---|
| 3,868,057 | A * | 2/1975 | Chavez | 235/380 |
| 5,220,593 | A * | 6/1993 | Zicker et al. | 455/407 |
| 5,570,084 | A | 10/1996 | Ritter et al. | |
| 5,604,788 | A | 2/1997 | Tett | |
| 5,614,703 | A * | 3/1997 | Martin et al. | 235/382 |
| 5,875,401 | A | 2/1999 | Rochkind | |
| 6,023,687 | A * | 2/2000 | Weatherly et al. | 705/38 |
| 6,088,594 | A | 7/2000 | Kingdon et al. | |
| 6,119,167 | A | 9/2000 | Boyle et al. | |
| 6,138,158 | A | 10/2000 | Boyle et al. | |
| 6,148,405 | A | 11/2000 | Liao et al. | |
| 6,178,331 | B1 | 1/2001 | Holmes et al. | |
| 6,185,208 | B1 | 2/2001 | Liao | |
| 6,195,667 | B1 | 2/2001 | Duga et al. | |
| 6,430,406 | B1 * | 8/2002 | Frisk | 455/407 |
| 7,006,994 | B1 * | 2/2006 | Campbell et al. | 705/40 |
| 2001/0049636 | A1 * | 12/2001 | Hudda et al. | 705/26 |
| 2002/0013711 | A1 * | 1/2002 | Ahuja et al. | 705/1 |
| 2002/0022485 | A1 * | 2/2002 | Kolsky et al. | 455/452 |
| 2002/0161701 | A1 * | 10/2002 | Warmack | 705/39 |
| 2002/0186845 | A1 * | 12/2002 | Dutta et al. | 380/247 |

OTHER PUBLICATIONS

Chennai, Business Line: India:L Citibank unveils CitiAlert, Oct. 22, 2000, Businessline, p. 1.*
Federal Trade Commission staff, Federal Trade Commission Overview of the Identity Theft Prgrom, Sep. 2003, Federal Trade Commision, web edition, pp. 1-12.*

* cited by examiner

*Primary Examiner*—James P Trammell
*Assistant Examiner*—Marissa Liu
(74) *Attorney, Agent, or Firm*—Myers Bigel Sibley & Sajovec, P.A.

(57) ABSTRACT

A credit alert system. The system includes an account server for receiving an alert regarding at least one of available credit and credit status for a credit account. The system also includes an account database in communication with the server for storing information assigned to the account. The system further includes an application module in communication with the account server for receiving credit alerts for preparing a message to communicate to a wireless device.

14 Claims, 3 Drawing Sheets

CREDIT CARD MESSENGER

BACKGROUND OF THE INVENTION

1. Field of the Invention

The present invention relates generally to communications services and, more particularly, to a system and method for alerting credit card subscribers when credit card account balances reach or exceed a predetermined amount.

2. Description of the Background

Wireless carriers have recently introduced World Wide Web enabled mobile devices allowing subscribers having mobile devices with microbrowsers to access a variety of sites on the Internet. This service allows subscribers the freedom to access, among other things, electronic mail, stock quotes, weather and travel information from anywhere within the wireless carrier's coverage area.

Despite the convenience of mobile Web access, many subscribers find it difficult to access their credit card accounts from mobile devices to check card status and available credit. This is due in large part to the number of keystrokes involved in inputting the subscriber's credit card account and personal information. The recent standardization of wireless application protocol may help to eliminate this problem.

Wireless application protocol (WAP) is an open specification that offers a standard method to access Internet-based content and services from wireless devices such as mobile phones and PDAs (Personal Digital Assistants). WAP is a layered communication protocol that includes network layers (e.g., transport and session layers) as well as an application environment including a microbrowser, scripting, telephony value-added services and content formats. This architecture allows WAP services to be hosted on standard world wide web (WWW) servers since they communicate with a WAP gateway/proxy using standard Internet protocols.

A system is needed that allows subscribers to a wireless web access service to receive unsolicited messages regarding important changes to their credit card or other line of credit status to eliminate the possibility of an embarrassing situation when attempting to purchase goods or services with a credit card over its credit limit or one that is temporarily suspended. The system should provide near real-time updates as credit card status or credit limit/available balance changes.

SUMMARY OF THE INVENTION

The present invention, in one embodiment, is directed to a credit alert system. The system includes an account server for receiving an alert regarding at least one of available credit and credit status for a credit account. The system also includes an account database in communication with the server for storing information assigned to the account. The system further includes an application module in communication with the account server for receiving credit alerts for preparing a message to communicate to a wireless device.

BRIEF DESCRIPTION OF THE DRAWINGS

For the present invention to be understood clearly and readily practiced, the present invention will be described in conjunction with the following figures, wherein.

DETAILED DESCRIPTION OF THE INVENTION

Figure 1:
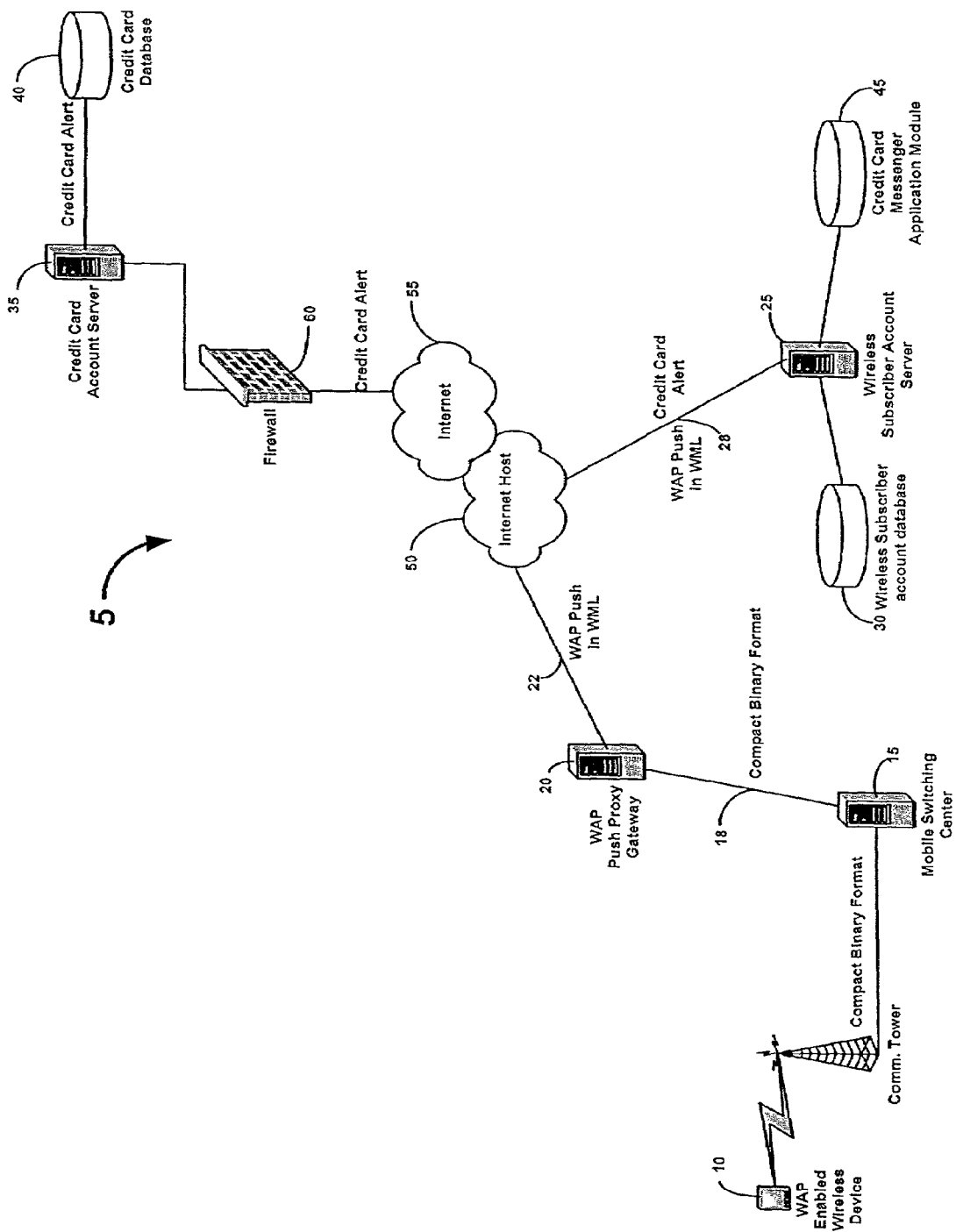
FIG. 1 is a simplified schematic diagram of an embodiment of a system for sending credit card status and balance information to a wireless mobile device.

It is to be understood that the figures and descriptions of the present invention have been simplified to illustrate elements that are relevant for a clear understanding of the present invention while eliminating, for the purpose of clarity, other elements. For example, certain details of a wireless network and certain account management platforms are not described herein. Those of ordinary skill in the art will recognize, however, that these and other elements may be desirable in a typical wireless network. A discussion of such elements is not provided because such elements are well known in the art and because they do not facilitate a better understanding of the present invention.

The various features of the invention will now be described with respect to the figures, in which like parts are identified with the same reference characters. The following description utilizes the wireless application protocol (WAP) and wireless markup language (WML) standards as a basis for linking a wireless device to a remote application. It will be recognized that these standards are used by way of example only, and that the inventive concepts here are equally applicable in other environments that do not operate in accordance with these particular standards.

FIG. 1 is a simplified schematic diagram of a system 5, according to one embodiment of the present invention, for managing communication from a credit card server to a mobile device. The system includes a WAP enabled wireless device 10, a mobile switching center (MSC) 15, a WAP Push Proxy Gateway 20, a wireless subscriber account server 25, a wireless subscriber database 30, a credit card account server 35 and a credit card database 40, a credit card messenger application module 45, an Internet host 50, the Internet 55 and a firewall 60. The wireless device 10 may be any wireless device capable of accessing the Internet 55 such as a WAP-enabled mobile telephone, a personal digital assistant or a pager.

Mobile switching center 15 may comprise any one of a number of known communications switching devices, including those commonly used and known in the art for providing either digital or analog cellular telephone service to a plurality of wireless devices 10. The mobile switching center 15 performs switching functions to permit communication between the Internet host 50 and the wireless device 10. Although only one mobile switching center 15 is shown, it will be understood that system 5 may include others.

The WAP Push Proxy gateway 20 refers to a software infrastructure or hardware device that connects the wireless domain (i.e. wireless device 10 and MSC 15) with the Internet host 50. Specifically, the WAP Push Proxy gateway 20 carries out protocol conversions between WAP communication protocols and Internet communication protocols (e.g. HTTP, TCP/IP). The WAP Push Proxy gateway 20 also performs content encoding, such as encoding of wireless markup language (WML) into binary format and compilation of WML-Scripts. The WAP Push Proxy gateway 20 may reside within the wireless carrier's network or may reside within a corporate business environment. The WAP Push Proxy gateway may also be a PC or a workstation performing mapping and translation functions.

The credit card account server 35 includes one or more of the commercial credit card databases. Each record of this database corresponds to a subscriber's credit card account. The firewall 60 is a system, usually a combination of hardware and software, interposed between the credit card account server 35 and the rest of the Internet 55 that enforces a security policy on communication traffic entering and leaving an internal network. As shown in FIG. 1, communications to and from the credit card account server 35 go through the firewall 60.

The wireless subscriber account server 25 communicates with the wireless subscriber account database 30. The subscriber account database identifies a particular subscriber's wireless account and subscriber's client addresses such as user-defined identifiers and/or mobile device addresses. Additionally, it includes data used to match an incoming alert from the credit card account server 35 to an individual wireless subscriber.

The credit card messenger application module 45 carries out administrative transactions in connection with credit card alert transmission from the credit card account server 35. Module 45 may be implemented using hardware or software and may reside as software on the wireless subscriber account server 25. Those skilled in the art will appreciate that the process described below may be implemented at any level, ranging from hardware to application software and in any appropriate physical location. For example, module 45 may be implemented as software code to be executed by the wireless subscriber account server 25 using any suitable computer language such as, for example, microcode, and may be stored in, for example, an electrically erasable programmable read only memory (EEPROM), or can be configured into the logic of the subscriber account server 25. According to another embodiment, module 45 may be implemented as software code to be executed by the subscriber account server 25 using any suitable computer language such as, for example, Java, Perl, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as CD-ROM. The application module 45 may also be a computer, such as a workstation or a personal computer, a microprocessor, a network server, or an application specific integrated circuit, using any suitable type of computer instruction.

The mobile switching center 15 is coupled to the WAP Push Proxy gateway 20 by communication link 18, which may be, for example, a T1 or a T3 connection. The WAP Push Proxy gateway 20 is coupled to the Internet host 50 by communication link 22, which may be, for example, a T1 connection or a T3 connection. Communication link 28 couples the wireless subscriber account server 25 to the Internet host 50 using, for example, a T1 or a T3 connection. Those skilled in the art will appreciate that the hardware and software interfaces between the elements shown in FIG. 1 are conventional and do not form part of the invention.

Figure 2A:
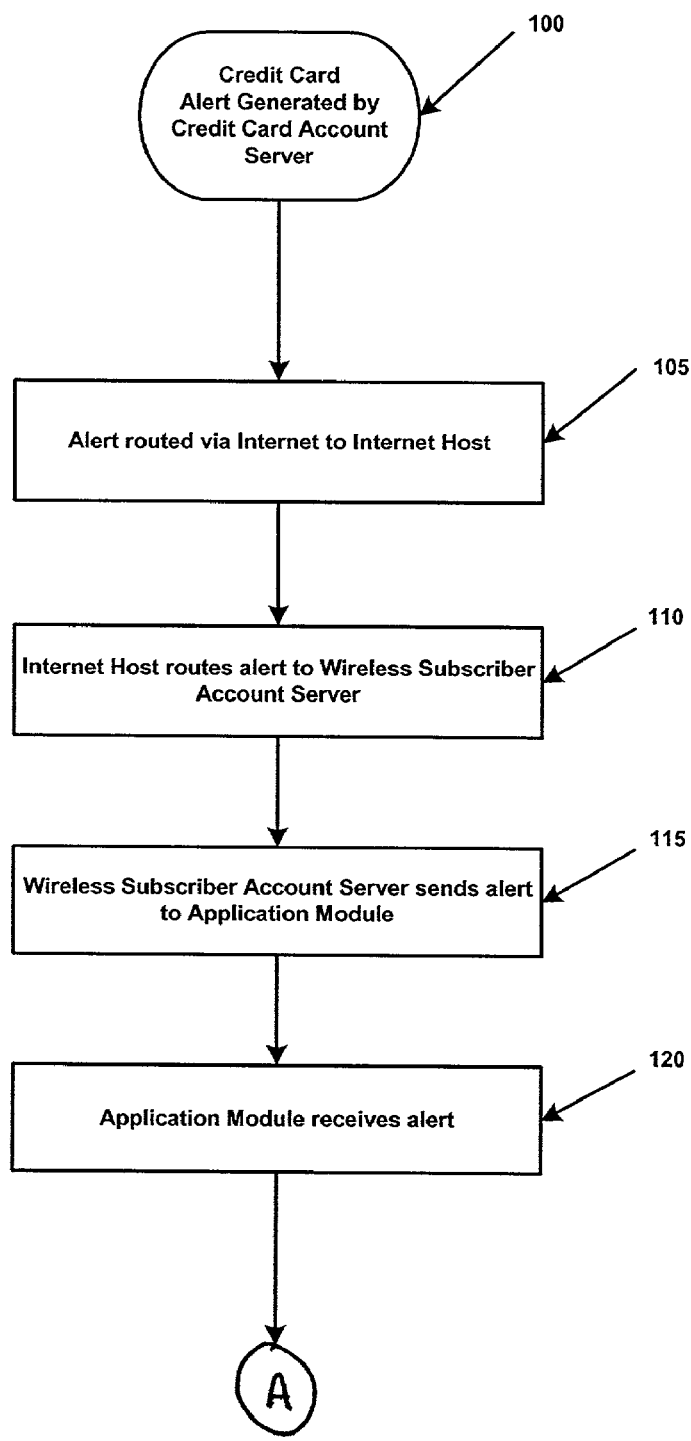
FIGS. 2A and 2B are exemplary flow diagrams that illustrate an embodiment of a process for sending credit card status information.
Figure 2B:
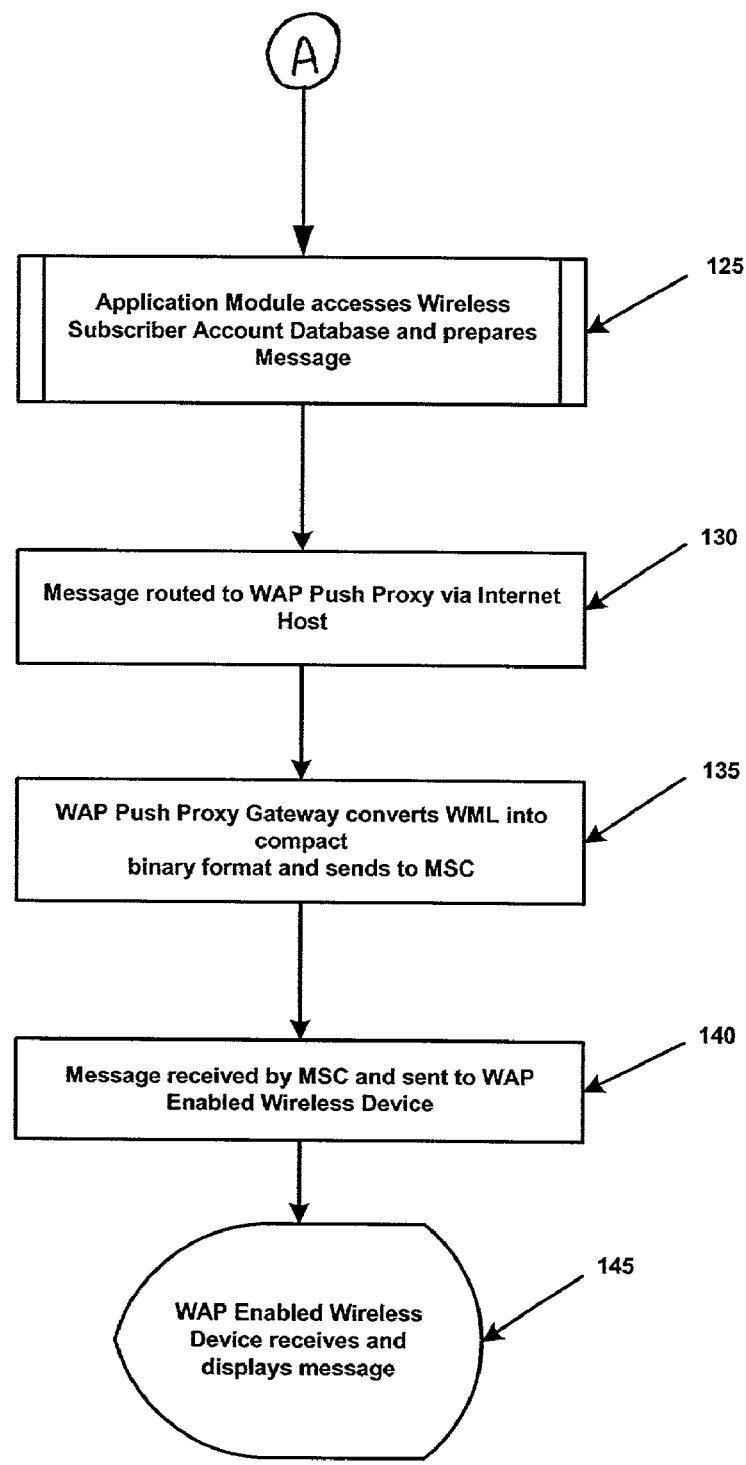

FIGS. 2A and 2B are simplified flow diagram that illustrates a process for transmission of credit card messages from a credit card database to a wireless subscriber's mobile device according to one embodiment of the present invention. The credit card account database 40 coupled to a credit card account server 35 generates the alert at step 100 and transmits it via the Internet 55. The alert is received at step 105 via the Internet host 50 and routed at step 110 to the appropriate server at step 115, in this instance the wireless subscriber account server 25. The application module 45 receives the alert at step 120 from the wireless subscriber account server 25. The application module 45 then accesses the wireless subscriber account database 30 that, for example, may be maintained on the wireless subscriber account server 25. The application module 45 compares the information contained in the credit card alert to the subscriber information contained in the subscriber account database 30 to determine the correct subscriber, and then issues a message at step 125 in, for example, Wireless Markup Language (WML), using, for example, a push framework to a client address taken from the wireless subscriber account database 30.

WAP push, called push access protocol, is used to convey content and push related control information between the application module 45 (the push initiator) and wireless device 10 without a previous subscriber action. The WAP push message is then routed to the WAP Push Proxy gateway at step 130 via the Internet host 50. The WAP Push Proxy gateway 20 parses the control information and transforms WML content into binary form. This information is then sent at step 135 from the WAP Push Proxy gateway 20 to the MSC 15 and then at step 140 to the subscriber's wireless device 10 using whatever mobile network bearer service is available, for example Short Message Service or General Packet Radio Service and is then displayed at step 145 on wireless device 10.

What is claimed is:

1. A credit alert system, comprising:
   a wireless subscriber account server for receiving a credit card alert from a credit card account database regarding at least one of available credit and credit status for a credit card account, wherein the credit card account database does not have or have access to wireless subscriber account information for a person associated with the credit card account, wherein the credit card alert is unsolicited by the person associated with the credit card account;
   a wireless subscriber account database in communication with the wireless subscriber account server for storing wireless subscriber account information;
   an application module in communication with the wireless subscriber account server for comparing information contained in the unsolicited credit card alert to subscriber information contained in the wireless subscriber database to determine a wireless subscriber associated with a credit card account and for preparing a message to communicate to a wireless device of a subscriber in response to receiving the unsolicited credit card alert from the credit card account database; and
   a Wireless Application Protocol (WAP) push proxy gateway in communication with the wireless subscriber account server that sends the message to the wireless device of the subscriber using a mobile network service.

2. The system of claim 1, wherein the wireless device is Wireless Application Protocol (WAP) enabled.

3. The system of claim 1, wherein the wireless device is a wireless telephone.

4. The system of claim 1, wherein the wireless device is a personal digital assistant.

5. The system of claim 1, wherein the wireless device is a pager.

6. The system of claim 1, wherein the wireless device is a portable computer having a wireless modem.

7. A method for alerting a wireless device regarding a credit card account, the method comprising:
   receiving a credit card alert from a credit card account database at an application module in communication with a wireless subscriber account database, wherein the credit card account database does not have or have access to wireless subscriber account information for a person associated with the credit card account, wherein the credit card alert is unsolicited by the person associated with the credit card account;
   matching the alert to a wireless subscriber's account by comparing information contained in the unsolicited credit card alert to subscriber information contained in the wireless subscriber database;

generating a message relating to the credit card account; and pushing the message to the wireless device of the wireless subscriber via a WAP enabled push proxy gateway that sends the message using a network service.

8. The method of claim 7, wherein the wireless device is Wireless Application Protocol (WAP) enabled.

9. The method of claim 7, wherein the message is a WAP push initiator.

10. The method of claim 9, wherein the message is transmitted when the credit card account exceeds a predetermined amount.

11. The method of claim 9, wherein the message is transmitted upon non-receipt of a credit payment.

12. The method of claim 9, wherein the message is transmitted when the credit card account is past due.

13. The method of claim 9, wherein the message is transmitted upon suspension of the credit card account.

14. A system for alerting a wireless device regarding a credit card account, comprising:

means for receiving a credit card alert from a credit card account database, wherein the credit card account database does not have or have access to wireless subscriber account information for a person associated with the credit card account, wherein the credit card alert is unsolicited by the person associated with the credit card account;

means for matching the unsolicited credit card alert to a wireless subscriber's account;

means for generating a message relating to the credit card account; and means for pushing the message to the wireless device of the wireless subscriber via a WAP enabled push proxy gateway that sends the message using a network service.

* * * * *

UNITED STATES PATENT AND TRADEMARK OFFICE
CERTIFICATE OF CORRECTION

| | | |
|---|---|---|
| PATENT NO. | : 7,698,215 B1 | Page 1 of 1 |
| APPLICATION NO. | : 10/090180 | |
| DATED | : April 13, 2010 | |
| INVENTOR(S) | : McQuaide et al. | |

It is certified that error appears in the above-identified patent and that said Letters Patent is hereby corrected as shown below:

Column 6, Claim 14, Line 18: Please correct by deleting "a" and adding -- an available --

Signed and Sealed this

Twenty-seventh Day of July, 2010

David J. Kappos
*Director of the United States Patent and Trademark Office*